United States Patent
Pries et al.

(10) Patent No.: US 12,259,051 B2
(45) Date of Patent: Mar. 25, 2025

(54) PRESSURE RELEASE HOUSING

(71) Applicant: Honeywell International Inc., Morris Plains, NJ (US)

(72) Inventors: Henning Johannes Michael Pries, Lower Saxony (DE); August Wallmeyer, Recke (DE); Christof Hermann Esselmann, Nordwalde (DE); Guido Temme, Bad Iburg (DE); Thomas Niehaus, Niedersachen (DE)

(73) Assignee: Honeywell International Inc., Charlotte, NC (US)

( * ) Notice: Subject to any disclaimer, the term of this patent is extended or adjusted under 35 U.S.C. 154(b) by 848 days.

(21) Appl. No.: 17/224,168

(22) Filed: Apr. 7, 2021

(65) Prior Publication Data

US 2022/0325812 A1 Oct. 13, 2022

(51) Int. Cl.
*F16K 17/30* (2006.01)
*F16K 1/30* (2006.01)

(52) U.S. Cl.
CPC .............. *F16K 17/30* (2013.01); *F16K 1/307* (2013.01)

(58) Field of Classification Search
CPC ........ F16K 17/30; F16K 1/307; F16K 17/403; F16K 17/28
See application file for complete search history.

(56) References Cited

U.S. PATENT DOCUMENTS

| 5,042,675 | A | 8/1991 | Patterson | |
|---|---|---|---|---|
| 9,648,762 | B2 | 5/2017 | Boe | |
| 2012/0255988 | A1* | 10/2012 | Perry | B23K 3/08 228/8 |
| 2018/0219200 | A1* | 8/2018 | Albukrek | H01M 50/333 |
| 2020/0185751 | A1* | 6/2020 | Yoshitomi | H01M 8/2485 |
| 2021/0257699 | A1* | 8/2021 | Mochizuki | H01G 2/103 |

FOREIGN PATENT DOCUMENTS

| CH | 664221 A | * | 2/1988 | .......... G01M 3/3236 |
|---|---|---|---|---|
| CN | 209544941 U | | 10/2019 | |
| ES | 2725434 T3 | * | 9/2019 | .......... F16K 17/048 |
| JP | H-1033922 A | * | 2/1998 | ............ B01D 39/20 |
| KR | 101834880 B1 | * | 3/2018 | .......... B60R 21/268 |
| UA | 145720 U | * | 12/2020 | |

* cited by examiner

*Primary Examiner* — Natalie Huls
(74) *Attorney, Agent, or Firm* — John Maldjian, Esq.; Stevens & Lee PC

(57) ABSTRACT

One embodiment is a device comprising a first and second section of a housing connected by a connection region that uses a plurality of connection elements, an inlet connected to the first or the second section, an outlet connected to the first or the second section where a gas can exit the housing, and a valve connected to the outlet, the valve capable of withstanding a first pressure in the housing.

7 Claims, 7 Drawing Sheets

FIG 3
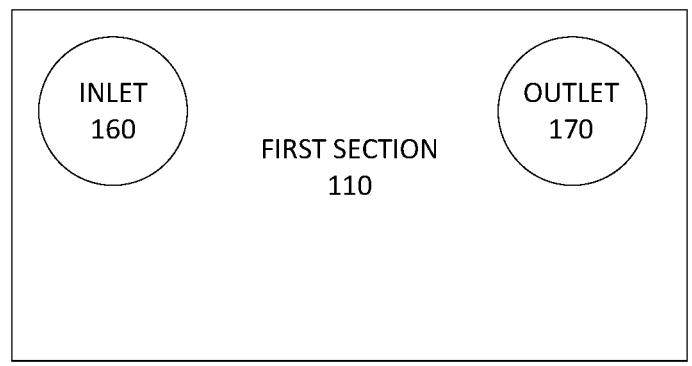
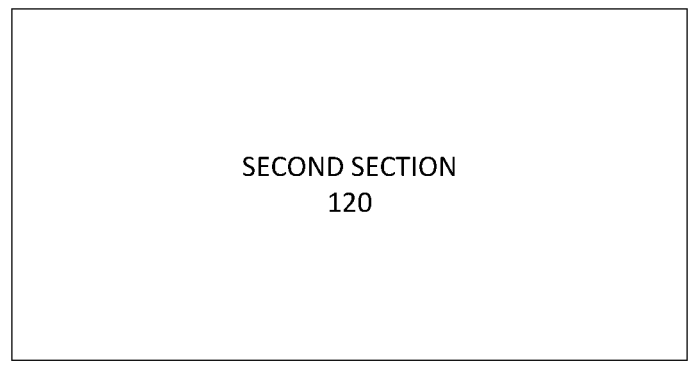

PRESSURE RELEASE HOUSING

CROSS-REFERENCE TO RELATED APPLICATIONS

BACKGROUND

Gas and other hazardous substances must be utilized in a safe and cost-efficient manner, so that people are not hurt and property is not damaged. There are many examples, where a gas grid had its pressure rapidly increase and cause catastrophic destruction due to gas leaking into the buildings. In response, a gas meter was developed which closes a valve in cases of increased pressure. This valve is only able to withstand a certain pressure, however. If the pressure keeps rising, the valve will be damaged and the gas may still be released.

BRIEF DESCRIPTION OF THE DRAWINGS

FIG. 3 is a diagram that illustrates the first and second sections of the pressure release housing after a pressure release event.

SUMMARY OF THE INVENTION

One embodiment is a device comprising a first and a second section of a housing connected by a connection region that uses a plurality of connection elements, an inlet is connected to the first section, an outlet is connected to the first or the second section where a gas can exit the housing, and a valve connected to the outlet, the valve capable of withstanding a first pressure in the housing.

Another embodiment is a system comprising a housing system having a first section and a second section connected by a connection region that uses a plurality of connection elements, an inlet system connected to the first or the second section, an outlet system connected to the first or the second section where a gas can exit the housing, a valve system connected to the outlet, the valve system capable of withstanding a first pressure in the housing, and a warning system, the warning system configured to generate a noise when the connection region fails, wherein the connection region is configured to withstand a second pressure, such that the connection region fails at one or more of the connection elements when the second pressure exists in the housing, the second pressure being smaller than the first pressure.

In another embodiment, a method includes providing a path through a housing for a gas to travel through, the housing having a first section and a second section, providing a connection region that uses a plurality of connection elements to connect the first and second sections, providing a valve connected to an outlet in the housing, the valve capable of withstanding a first pressure, providing a warning system, the warning system configured to generate a warning when the connection region fails, and causing the connection region to fail at one or more of the connection elements when a second pressure exists in the housing, the second pressure being smaller than the first pressure.

DETAILED DESCRIPTION OF THE INVENTION

Figure 1:
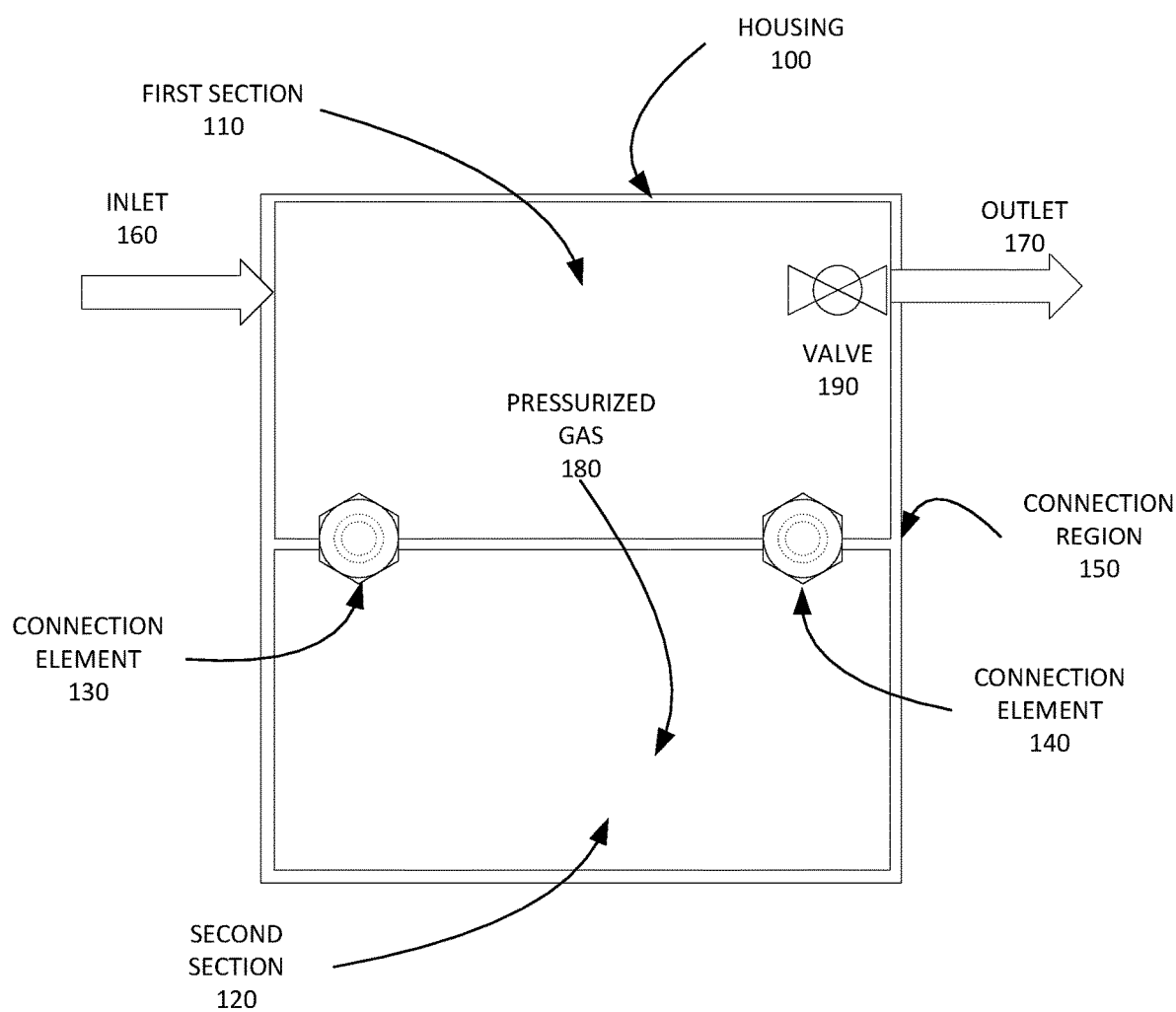
FIG. 1 is a diagram of a pressure release housing according to one embodiment.

FIG. 1 illustrates a pressure release housing 100 according to one embodiment. The housing 100 includes a first section 110 and a second section 120. The housing and its respective sections 110 and 120 can be components of a gas meter, for example, which carries a pressurized gas 180 within the housing 100 to an outlet 170 where it exits the housing 100. In other examples, any number of sections can be used. For simplicity, the example of FIG. 1 uses only two sections 110 and 120. A connection region 150 resides between the first section 110 and the second section 120. The connection region includes at least connection elements 130 and 140. In practice, any number of connection elements can be used. In some examples these can be screws, gaskets, or any other manner of connecting the first and second section in accordance with one or more embodiments.

In the current example, the first section 110 is shown as being above the second section 110. Furthermore, the first section 110 is shown as having essentially the same dimensions as the second section 120. This is for example only, as the first and second sections 110 and 120 can be arranged in a variety of ways. For example, the first section 110 could be in front of the second section 120. Likewise, the first and second sections 110 and 120 could have differing dimensions, (the second section 120 being flat and having a very small height compared to the first section 110, for example).

In operation, the pressurized gas 180 enters the housing 100 at an inlet 160 on the housing 100 and reaches a valve 190 prior to the outlet 170. The pressurized gas 180 fills the entirety of the first section 110 and the second section 120. If the valve 190 is open, the gas 180 can flow out of the outlet 170. When the valve 190 is closed, the gas 180 remains in the housing 100 and the valve 190 is capable of withstanding a first amount of pressure.

When the actual pressure in the housing 100 approaches a second pressure, which is smaller than the first pressure, the connection region 150 is configured to fail. When the connection region 150 fails, at least one connection element fails such that the gas 180 is no longer sealed within the first and second sections 110 and 120. In one example, the housing 100 is broken into its two respective components, the first section 110 and the second section 120 and the pressure is released. In other examples, the housing is only partially failing, and the first and second sections 110 and 120 remain partially connected after the pressure is released. It should be noted that the pressure never reaches the first pressure, which is the pressure at which the valve 190 is designed to fail.

Figure 2:
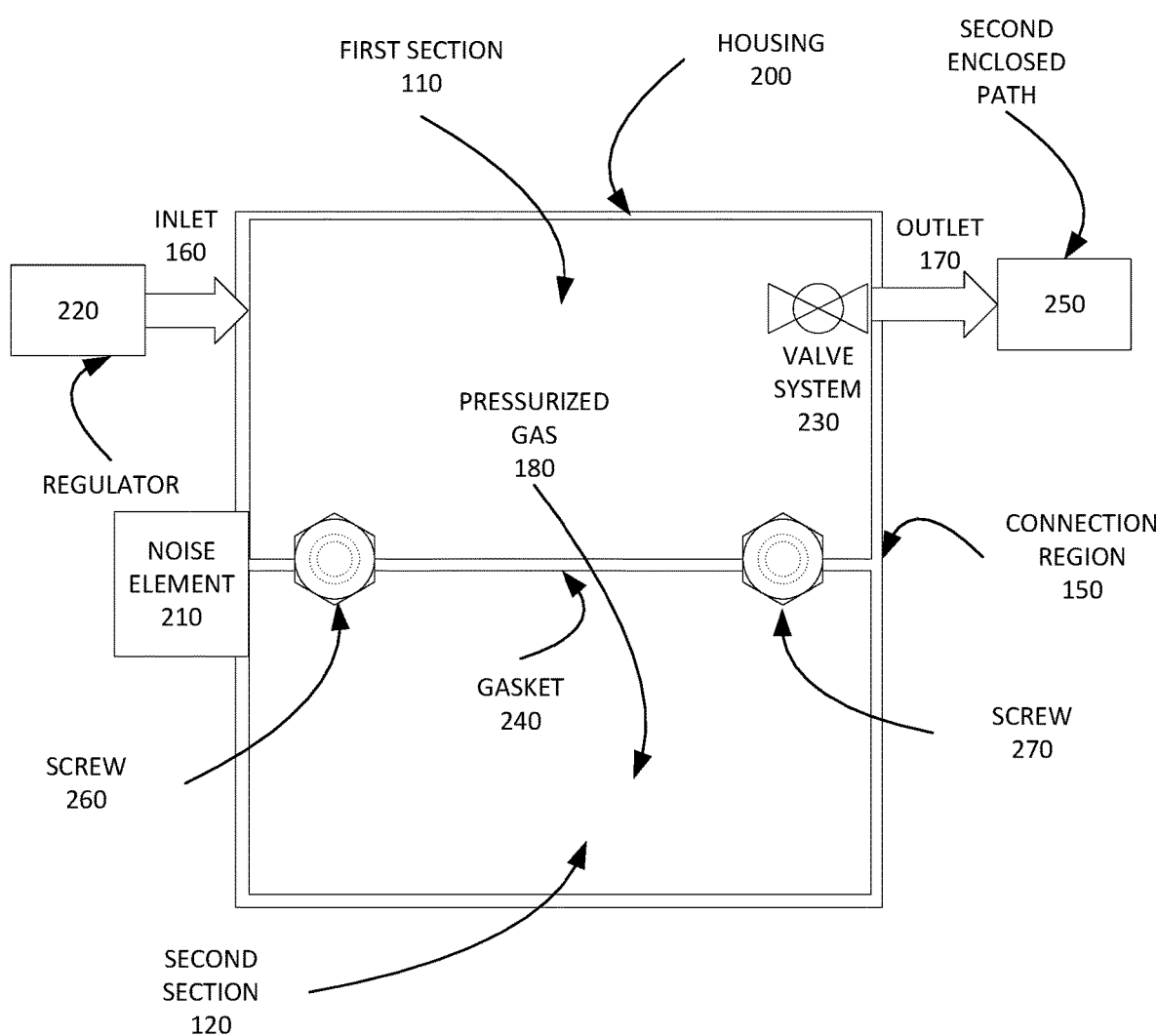
FIG. 2 is a diagram of the pressure release housing according to another embodiment.

FIG. 2 illustrates a pressure release housing 200 according to another embodiment. The housing 200 includes a first section 110 and a second section 120. The housing and its respective sections 110 and 120 can be components of a gas meter, for example, which carries a pressurized gas 180 within the housing 200. A connection region 150 resides between the first section 110 and the second section 120. The connection region includes at least screws 260 and 270. In one example, the screws 260 and 270 are configured to fail at a given pressure. This can be achieved, for example by choosing a depth for the screw 260 and/or the screw 270.

This can also be achieved by choosing a torque for the screw 260 and/or the screw 270. It one example, the configuration of the connection region 150 includes a combination of both a suitable depth and torque for each of the screws 260 and 270, such that at least one of the screws 260 and 270 are pulled out at the given pressure suitable for the housing 200 and the application for the housing 200.

In one embodiment, a noise element 210 is added at the connection region 150. The noise element 210 can be a whistle or other suitable noise element 210. The noise element 210 is configured to generate an audible noise or warning when the connection region 150 fails. This could enable a human or other operator, for example, to react more rapidly to the situation and potentially mitigate any damage that is caused by the failure of the connection region 150. A regulator 220 is included in one example prior to the inlet 160. The regulator 220 can be configured to release pressure prior to the gas 180 reaching the inlet 160, in scenarios where the pressure rises to the second pressure. In another example, an enclosed path 250 is provided. The enclosed path 250 can be used, for example, to route the gas 180 from an indoor environment to an outdoor environment. This can be useful in cases where the gas 180 might be released indoors in the case of failure of the housing 200 from increased pressure. In one example, the enclosed path 250 has a first inlet (not shown) associated with the outlet 170, and a first outlet (not shown) at the aforementioned outdoor environment.

In operation, the gas 180 travels through an inlet 160 on the housing 200 and reaches a valve system 230 within the housing 200. The valve system 230 could include a plurality of valves. Each of the valves in the valve system 230 is capable of withstanding a first pressure in normal operation. Additional valves in the valve system 230 can be used as a safeguard to release pressure in case the first pressure is exceeded. If the valve system 230 is open, the gas 180 can flow out of outlet 170. When the valve system 230 is closed, the gas 180 remains in the housing 200. When the actual pressure in the housing 200 approaches a second pressure, which is smaller than the first pressure, the connection region 150 is configured to fail.

When the connection region 150 fails, the first section 110 and the second section 120 are no longer sealed together, and the pressure is released. FIG. 3 is a diagram that illustrates the first and second sections 110 and 120 of the pressure release housing after a pressure release event. FIG. 3 shows a top-down view of the inside of the housing 200. The first section 110 includes the areas where the inlet 160 and the outlet 170 connect to the housing. The second section 120 is also visible from a top-down view and in this example, they have been separated into two distinct components. In other examples, a hinging mechanism could be used and the first and second sections 110 and 120 could remain physically attached to each other. In other examples, a subset of the connection elements fail, in which case the first and second sections 110 and 120 remain attached to one another but the seal between the two can no longer house the pressurized gas 180. In either scenario, the pressure is released in a safer manner.

Referring back to FIG. 2, it should be noted that the pressure never reaches the first pressure, which is the pressure at which the valve system 230 is designed to fail. Instead, the pressure release event shown in FIG. 3 occurs. Keeping the pressure below the first pressure can include any combination of using screws 260 and 270 configured to fail at a second pressure below the first pressure. In another example, a gasket 240 is used in the connection region 150.

The gasket 240 can be designed such that it is weakened so that it fails at the second pressure. In another example, the housing 200 is weakened during a manufacturing process (including being casted or deep-drawn) such that it will fail at the second pressure. It should be noted that some or all of these configurations can be used in different embodiments.

Figure 4:
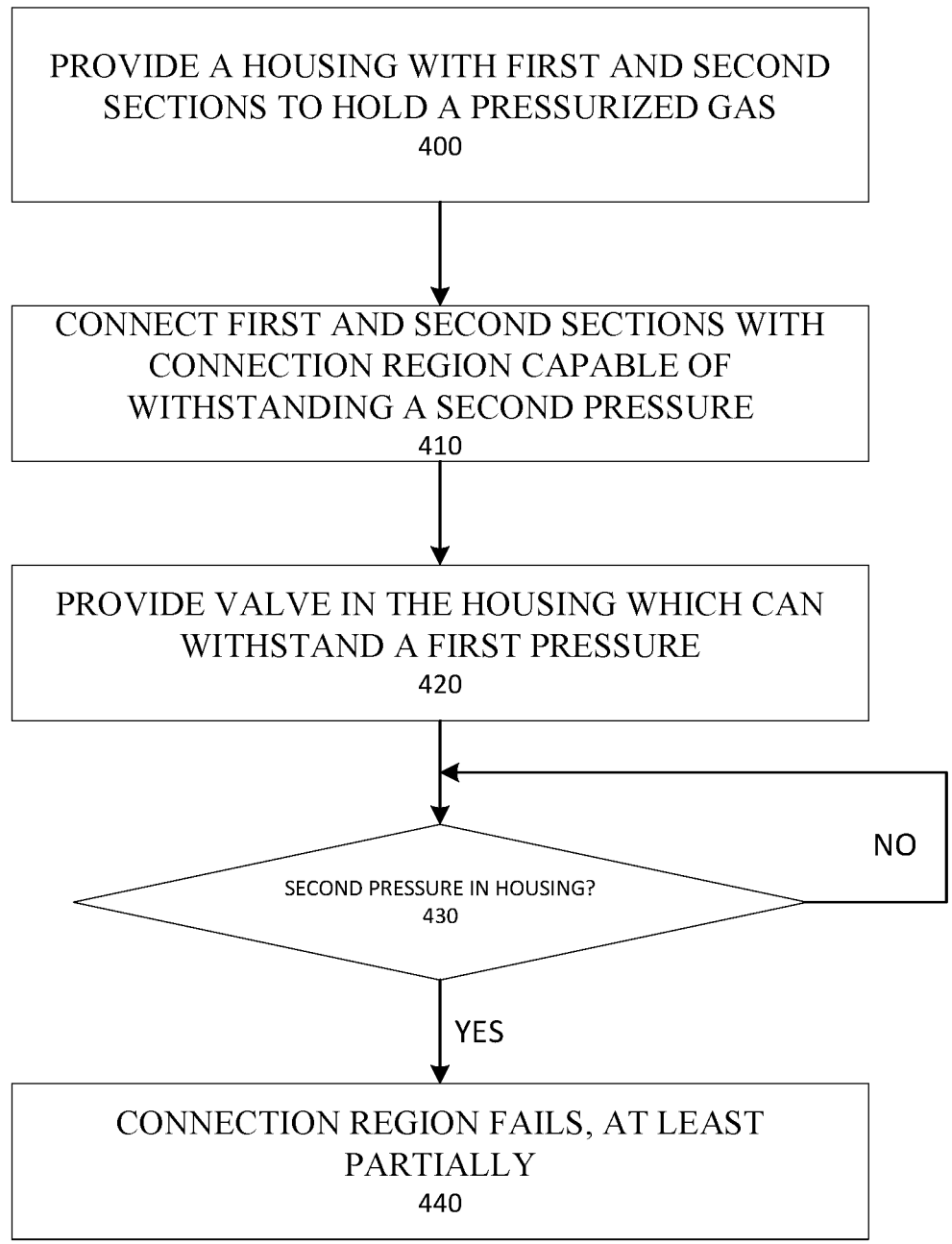
FIG. 4 is a flowchart that illustrates the operation of the pressure release housing according to one embodiment.

FIG. 4 is a flowchart that illustrates the operation of the pressure release housing according to one embodiment. At step 400, a housing is provided that has a first and second section. The housing can be configured, for example, to hold a pressurized gas therein. The first and second sections can be connected by a connection region at 410, which can seal the gas in the housing and maintain a given pressure. The connection region can be configured such that it fails a specific, pre-defined pressure. In the current example, the specific, pre-defined pressure is referred to as a second pressure, although any pressure can be used. This configuration is hereinafter referred to as the pressure release housing.

At step 420, a valve is provided within the housing. The valve can be, for example, before an outlet on the first section of the pressure release housing. Alternatively, the valve can be in any suitable location. At step 430, it is determined whether the pressure in the housing exceeds the second pressure. If not, the system operates normally. If the second pressure is ever exceeded, the connection region fails at step 440 and the pressure is released. This could be, for example, as shown in FIG. 3 where the first and second sections fail at a connection element and no longer can house the pressurized gas 180. It could also be achieved in a number of other ways, such as screws with pre-defined depth and torque properties, a gasket that has a weakened structure, imparted weaknesses into the pressure release housing itself, and any combination of these configurations.

Figure 5:
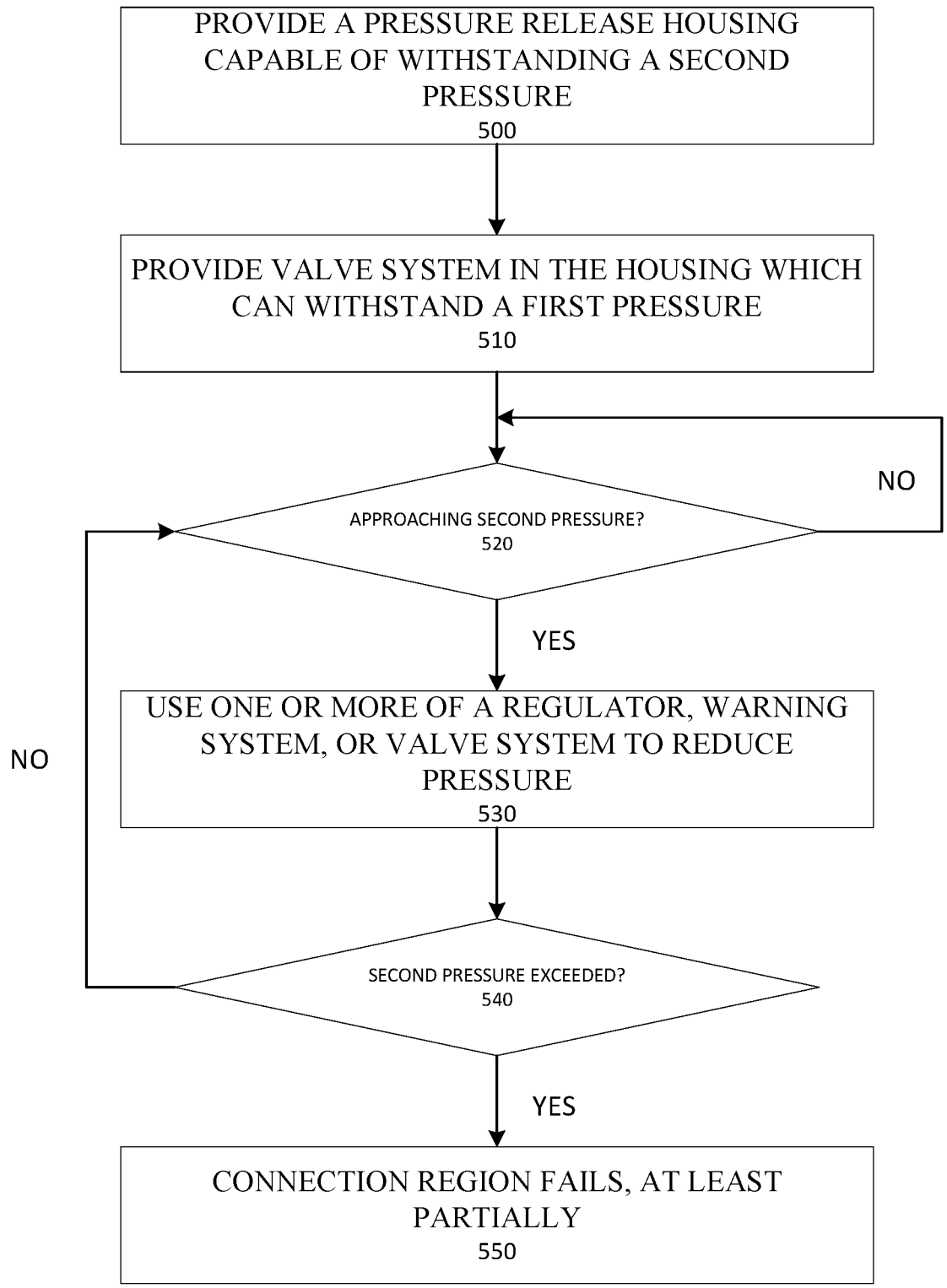
FIG. 5 is a flowchart that illustrates the operation of the pressure release housing according to another embodiment.

FIG. 5 is a flowchart that illustrates the operation of the pressure release housing according to another embodiment. At step 500, a pressure release housing is provided. The pressure release housing capable of withstanding a second pressure, which is smaller than a first pressure. At step 510, a valve is provided within the pressure release housing. The valve can be, for example, before an outlet on the first section of the pressure release housing.

Alternatively, the valve can be in any suitable location. The valve is capable of withstanding the first pressure.

At step 520, it is determined whether the pressure in the housing is approaching the second pressure. If not, the system operates normally. If the second pressure is approached too closely, then at step 530 one or more of a regulator, a warning or noise-making system, or a valve system is used to release the pressure. At step 530, it is determined whether the pressure in the housing exceeds the second pressure. If not, then step 520 repeats and the system operates normally until such time as the second pressure is approached too closely again. If at step 530, the second pressure is exceeded, then the connection region fails at step 550 and the pressure is released.

Figure 6:
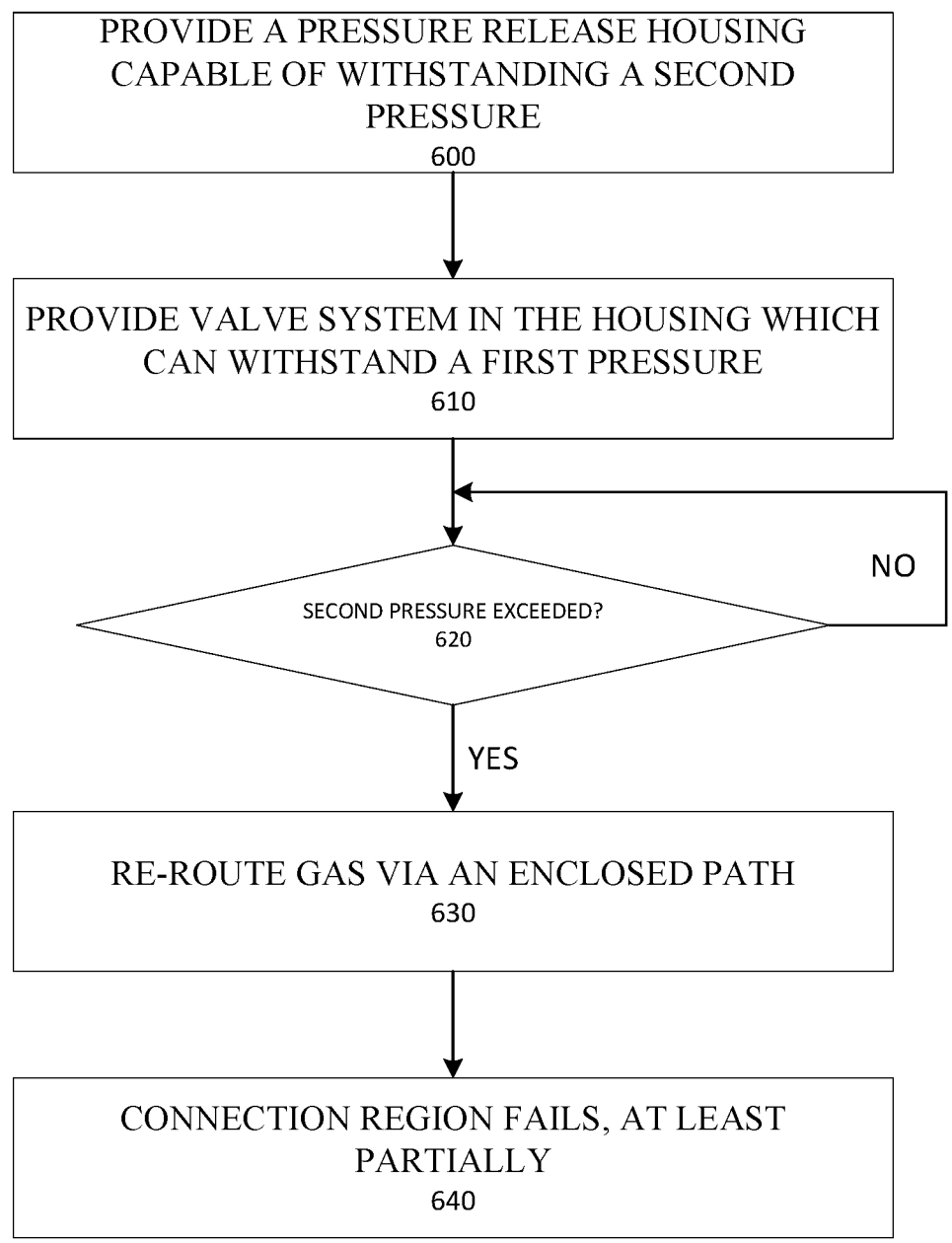
FIG. 6 is a flowchart that illustrates the operation of the pressure release housing according to another embodiment.

FIG. 6 is a flowchart that illustrates the operation of the pressure release housing according to another embodiment. At step 600, a pressure release housing is provided. The pressure release housing capable of withstanding a second pressure, which is smaller than a first pressure. At step 610, a valve is provided within the pressure release housing. The valve can be, for example, before an outlet on the first section of the pressure release housing. Alternatively, the valve can be in any suitable location. The valve is capable of withstanding the first pressure.

At step 620, it is determined whether the pressure in the housing exceeds the second pressure. If not, then step 620 repeats and the system operates normally until such time as the second pressure is exceeded. If at step 620, the second pressure is exceeded, then the gas 180 is re-routed via an enclosed path at step 630. This could be, for example, by constructing the enclosed path from an indoor environment to an outdoor environment. The outdoor environment can be used as a location for an outlet on the enclosed path such that the gas 180 released there is considered less dangerous to people or property. At step 640, the connection region of the pressure release housing fails. This could also be achieved in a number of ways, such as screws with pre-defined depth and torque properties, a gasket that has a weakened structure, imparted weaknesses into the pressure release housing itself, and any combination of these configurations.

Figure 7:
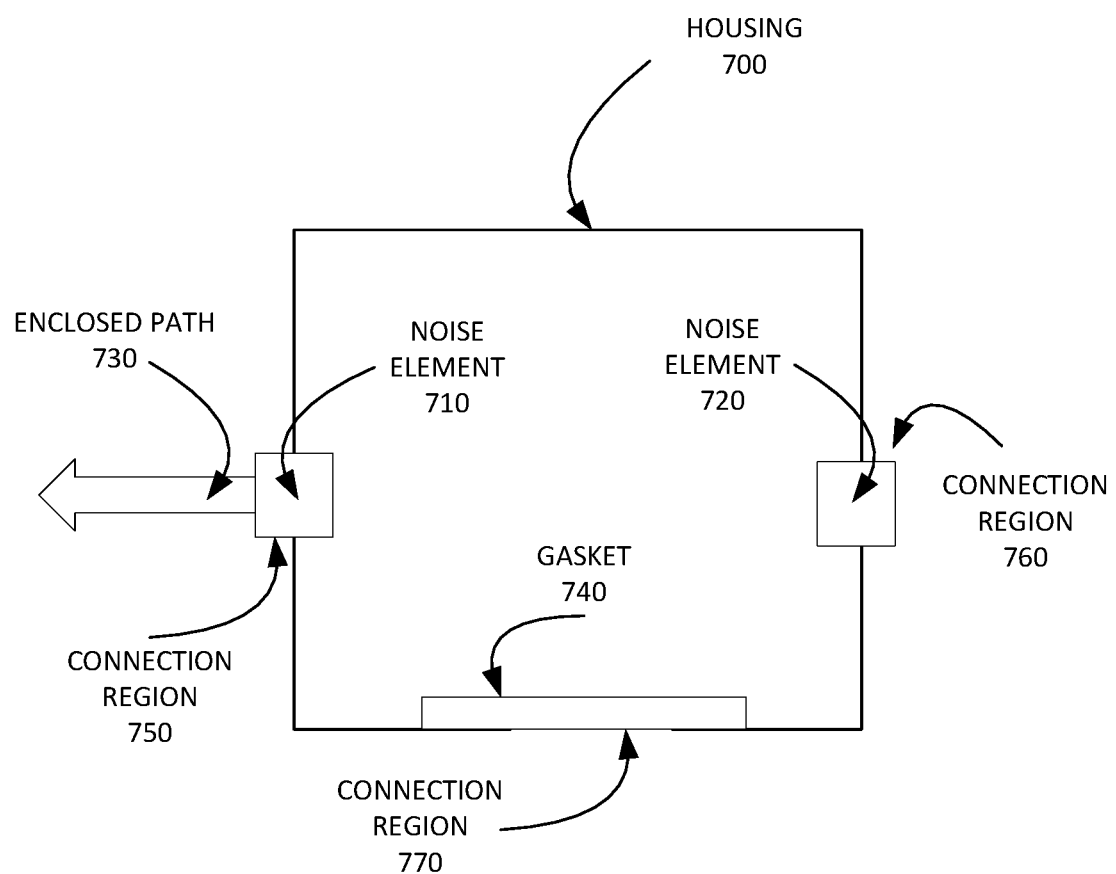
FIG. 7 is a diagram of the pressure release housing according to another embodiment.

FIG. 7 is a diagram of the pressure release housing according to one embodiment. A housing 700 encloses a pressurized gas. Connection regions 750, 760, and 770 are used to seal the gas within the housing 700. In one example, the connection regions 750 and 760 include screws configured to fail at a given pressure. Likewise, connection region 770 includes a gasket 740 configured to fail at a similar or the same pressure as the connection regions 750 and 760.

Noise elements 710 and 720 are added at the connection regions 750 and 760. The noise elements 710 and 720 can be a whistle, for example. The noise elements 710 and 720 are configured to generate a warning when its associated connection region fails. The warning could be, for example, an audible warning, a visual warning, or any other warning suitable for alerting an operator of the current condition of the connection regions 750 and 760. This could enable a human or other operator, for example, to react more rapidly to the situation and potentially mitigate any damage that is caused by the failure of either of the connection regions 750 and 760. An enclosed path 730 is provided. The enclosed path 730 can be used, for example, to route the pressurized gas from an indoor environment to an outdoor environment. This can be useful in cases where the gas might be released indoors in the case of failure of the housing 700 from increased pressure. In one example, the enclosed path 730 has an inlet associated with an outlet of the housing 700 and an outlet at the outdoor environment.

In operation, the gas travels through the housing 700 and reaches a valve system (not shown) within the housing 700. The valve system could include a plurality of valves. Each of the valves is capable of withstanding a first pressure in normal operation. Additional valves can be used as a safeguard to release pressure in case the first pressure is exceeded. If the valve system is open, the gas can flow out of the housing 700 in a normal manner. When the valve system is closed, the gas remains in the housing 700. When the actual pressure in the housing 700 approaches a second pressure, which is smaller than the first pressure, at least one of the connection regions 750-770 will configured to fail. When one of the connection regions 750-770 fails, the housing 700 is no longer sealed and the pressure is released.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A device comprising:
a first section of a housing;
a second section of the housing, the second section connected to the first section by a connection region that uses a plurality of connection elements;
an inlet, connected to the first or the second section, through which a gas enters the first section and the second section of the housing;
an outlet, connected to the first or the second section, through which the gas exits the housing; and
a valve connected to the outlet, the valve configured to withstand a first pressure in the housing,
wherein the connection region is configured to fail when a second pressure exists in the housing, the second pressure being smaller than the first pressure.

2. The device of claim 1 further comprising a second valve connected to the outlet, the second valve capable of withstanding a pressure that is greater than the second pressure.

3. The device of claim 1 further comprising a regulator connected prior the inlet, wherein the regulator is capable of releasing pressure prior to reaching the inlet.

4. The device of claim 1 wherein the connection elements comprise a plurality of screws wherein each of the screws is connected via one or more of a pre-defined amount of torque or a pre-defined amount of depth.

5. The device of claim 1 wherein the connection region includes a gasket, the gasket having at least one weakness, the weakness capable of causing the connection region to fail prior to reaching the first pressure.

6. The device of claim 1 further comprising a noise making element, wherein the noise making element is configured to generate noise when the connection region fails.

7. The device of claim 1 further comprising an enclosed path, the enclosed path capable of removing the pressure from the housing by diverting a gas within the enclosed path to an outdoor location.

* * * * *